United States Patent
Faschang et al.

(10) Patent No.: US 10,250,176 B2
(45) Date of Patent: Apr. 2, 2019

(54) CONTROL OF LONG-STATOR LINEAR MOTOR COILS OF LONG-STATOR LINEAR MOTOR STATOR

(71) Applicant: B&R INDUSTRIAL AUTOMATION GMBH, Eggelsberg (AT)

(72) Inventors: Leopold Faschang, Eggelsberg (AT); Christof Klappauf, Ainring (DE)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 16 days.

(21) Appl. No.: 15/603,956

(22) Filed: May 24, 2017

(65) Prior Publication Data

US 2017/0346434 A1 Nov. 30, 2017

(30) Foreign Application Priority Data

May 25, 2016 (AT) ............................... A 50476/2016

(51) Int. Cl.
*H02P 6/26* (2016.01)
*H02P 25/064* (2016.01)
(Continued)

(52) U.S. Cl.
CPC .............. *H02P 25/064* (2016.02); *H02P 5/74* (2013.01); *H02P 6/006* (2013.01); *H02P 25/06* (2013.01)

(58) Field of Classification Search
CPC .... H02P 7/29; H02P 6/182; H02P 6/26; H02P 6/085; H02P 6/16; H02P 5/68
(Continued)

(56) References Cited

U.S. PATENT DOCUMENTS 4,454,457 A 6/1984 Nakamura et al.
5,661,382 A 8/1997 Enami et al.
(Continued)

FOREIGN PATENT DOCUMENTS

| EP | 0 989 656 | 3/2000 |
|---|---|---|
| EP | 2 744 095 | 6/2014 |
| WO | 2008/026642 | 3/2008 |

OTHER PUBLICATIONS

Europe Search Report/Office Action conduccted in counterpart Europe Appln. No. EP 17 17 2226 (dated Oct. 11, 2017) (w/ partial machine translation).
(Continued)

*Primary Examiner* — Rina I Duda
(74) *Attorney, Agent, or Firm* — Greenblum & Bernstein, P.L.C.

(57) ABSTRACT

A method and device for controlling the n LLM coils of an LLM stator making it possible to change the polarity of the coil voltage of the n LLM coils more easily and with little circuit complexity. It is proposed to apply a first operating potential to n first input terminals of n half bridges, and apply a second operating potential to n second input terminals of the n half bridges. For each half bridge, a first switch is connected between a center point of the respective half bridge and the first input terminal, and a second switch is connected between the center point of the relevant half bridge and the second input terminal. The center point of the n half bridges is connected in each case to n first terminals of then LLM coils, and the second terminals of then LLM coils are connected in a control point that is regulated to a predetermined potential.

16 Claims, 8 Drawing Sheets

(51) Int. Cl.
   *H02P 5/74* (2006.01)
   *H02P 6/00* (2016.01)
   *H02P 25/06* (2016.01)

(58) Field of Classification Search
   USPC .......... 318/400.26, 400.27, 400.29, 811, 599
   See application file for complete search history.

(56) References Cited

U.S. PATENT DOCUMENTS

| | | | | |
|---|---|---|---|---|
| 5,818,178 | A * | 10/1998 | Marumoto | H02P 7/0094 |
| | | | | 318/400.32 |
| 6,278,251 | B1 | 8/2001 | Schöb | |
| 6,362,608 | B1 | 3/2002 | Ashburn et al. | |
| 6,903,526 | B2 * | 6/2005 | Weisser | H02P 6/085 |
| | | | | 318/400.26 |
| 7,042,182 | B2 * | 5/2006 | Hahn | H02P 6/14 |
| | | | | 318/400.3 |
| 7,208,893 | B2 * | 4/2007 | Furuki | H02P 5/68 |
| | | | | 318/400.01 |
| 7,755,312 | B2 * | 7/2010 | Hirata | H02P 6/26 |
| | | | | 318/400.13 |
| 7,759,889 | B2 * | 7/2010 | Hirata | H02P 6/182 |
| | | | | 318/400.13 |
| 7,786,688 | B2 * | 8/2010 | Hayashi | H02P 7/29 |
| | | | | 318/400.26 |
| 7,863,841 | B2 * | 1/2011 | Menegoli | H03F 1/0227 |
| | | | | 318/293 |
| 7,969,108 | B2 * | 6/2011 | Vermeir | H02P 6/182 |
| | | | | 318/254.1 |
| 8,030,866 | B2 * | 10/2011 | Imai | H02P 6/16 |
| | | | | 318/400.06 |
| 8,531,139 | B2 * | 9/2013 | Murata | H02P 25/032 |
| | | | | 318/114 |
| 2004/0008011 | A1 | 1/2004 | Wang et al. | |
| 2005/0189891 | A1 | 9/2005 | Kurosawa et al. | |
| 2006/0108955 | A1 | 3/2006 | Knight et al. | |
| 2006/0220623 | A1 | 10/2006 | Andruzzi et al. | |
| 2009/0121665 | A1 | 5/2009 | Kuwamura | |
| 2014/0062433 | A1 | 3/2014 | Zhou et al. | |

OTHER PUBLICATIONS

Austria Search Report conduccted in counterpart Austria Appln. No. A 50476/2016 (dated Jan. 2, 2017).

* cited by examiner (State of the Art)

(State of the Art)

CONTROL OF LONG-STATOR LINEAR MOTOR COILS OF LONG-STATOR LINEAR MOTOR STATOR

CROSS-REFERENCE TO RELATED APPLICATIONS

The present application claims priority under 35 U.S.C. § 119(a) of Austria Patent Application No. A50476/2016 filed May 25, 2016, the disclosure of which is expressly incorporated by reference herein in its entirety.

BACKGROUND OF THE INVENTION

1. Field of the Invention

The present invention relates to a method and device for controlling a plurality of LLM coils of an LLM stator.

2. Discussion of Background Information

A stator of a long-stator linear motor (LLM) is composed of a plurality of adjacently-arranged LLM coils, which together form the stator of the LLM. These LLM coils are controlled individually or in groups, wherein, when the long-stator linear motor is running, it is often also desired or necessary to change the polarity, i.e., the direction of flow of the LLM coils. The control of the LLM coils produces a moving magnetic field that interacts with excitation magnets (usually permanent magnets) at a transport unit of the LLM in order to move the transport unit along the stator. The basic structure and function of an LLM are then sufficiently well known, and are therefore not addressed in further detail here. Energizing the LLM coils in order to generate the magnetic field yields an operating voltage between a first operating potential and a second operating potential.

One possibility for controlling LLM coils and ensuring a change in the polarity of the coil voltage would be to use a full bridge, such as is disclosed in US 2006/0220623 A1. The operating voltage is then respectively applied to the first and second branch of the full bridge, and the LLM coil is connected to the transverse branch of the full bridge. Appropriately controlling the four switches (bipolar transistors, MOSFETs, IGBTs, etc.) of the full bridge makes it possible to apply, to the LLM coil, a coil voltage that is desired, or predetermined by a coil control, in the desired polarity and level to the LLM coils. The ability to individually control the LLM coils necessitates providing each of the LLM coils with a full bridge. This means, however, that four switches are needed per LLM coil. A naturally high number of LLM coils of an LLM stator thus entails high costs and high circuit complexity due to the high number of switches.

SUMMARY OF THE EMBODIMENTS

The present invention addresses the problem of providing a method and device for controlling the LLM coils of an LLM stator that can be implemented more easily and with less circuit complexity and wherein the polarity of the coil voltage of the LLM coils also should be changeable.

This problem is solved according to the present invention by: applying a first operating potential to the n first input terminals of n half bridges, applying a second operating potential to the n second input terminals of the n half bridges, and—per half bridge—connecting a first switch between a center point of the respective half bridge and the first input terminal, and connecting a second switch between the center point of the relevant half bridge and the second input terminal. The center point of the n half bridges is, in each case, connected to n first terminals of the n LLM coils. The second terminals of the n LLM coils are connected to a control point, and a control unit regulates an actual potential to the control point to a predetermined potential. Closing the n first switches and opening the n second switches of the n half bridges causes, in each case, a coil voltage of a first polarity to be applied to the n LLM coils, while opening the n first switches and closing the n second switches of the n half bridges causes, in each case, a coil voltage of a second polarity to be applied to the n LLM coils. As a matter of course, the n first or n second terminals of the n LLM coils need not be directly connected to the center point of the n half bridges or to the control point, i.e., without other electrical components, in particular, passive components between the individual elements. For example, it would be conceivable to have additional chokes as filter elements, and, in particular, shunts for measuring currents through the LLM coils. Thus, only two switches are required per LLM coil, corresponding to a savings of 2*n. It should be noted, however, that a greater difference between the first operating potential and second operating potential, i.e., a greater operating voltage, is needed than with a full-bridge control.

Advantageously, the predetermined potential corresponds to the half operating voltage and/or the second operating potential is zero. With an operating voltage of 60 V, taken by way of example, there would thus result, with the method according to the present invention, a predetermined potential and therewith a coil voltage of plus or minus 30 V, whereas a full-bridge control always applies the total operating voltage (the 60 V taken here), positively or negatively, to the LLM coil.

Advantageously, a comparison unit compares the actual potential in the control point C with the predetermined potential, whereupon the control unit feeds a current by means of, for example, a current source to the control point on the basis of a potential difference between the actual potential and the predetermined potential, in order to regulate the potential difference to zero. The second terminals of the n LLM coils are connected to one another, whereby only one actual potential needs to be set. Thus, only one control unit is needed for all of the LLM coils.

The current source may include a choke and a voltage source, wherein the choke is connected to the control point and generates the current over a voltage generated by the voltage source at the choke.

The voltage source, in turn, may include a PWM module and a driver half bridge, wherein the PWM module regulates the driver half bridge in a manner dependent on the differential potential. The use of a choke is advantageous precisely therefor, because the choke integrates a voltage delivered from the voltage source and thus delivers a smoothed current. PWM modules are known for switching driver half bridges in such a manner as to produce rectangular voltages that are converted by the choke into triangular currents, and filter resulting voltage spikes.

It is very especially advantageous to assemble the driver half bridge with GaN switches. GaN switches allow a very high switching frequency, whereby the size of the choke can be reduced.

The comparison unit may, for example, include a resistor network that is connected to the first operating potential, the second operating potential, and the control point, and determines the potential difference from the first operating potential, the second operating potential, and the actual potential at the control point. Such a resistor network makes it very easy to determine the potential difference with the use of four resistors.

There may also be provided: a conversion unit that is connected to the comparison unit and converts the differential potential into a predetermined current; a sensor that measures the actual current in the control point; and a current controller that is connected on the input side to the conversion unit and the sensor and is connected on the output side to the current source, obtains the predetermined current from the comparison unit and the actual current from the sensor, determines a differential current, and regulates the current source therewith. Advantageously, the conversion unit is configured as a PI controller, preferably as a transconductance amplifier (operational transconductance amplifier, OTA) with an output-side RC element to ground. The predetermined current that is determined is used as a reference for the current controller, which also obtains the actual current from the sensor. If there is a deviation between the predetermined current and the actual current, the current source is controlled. Thus, for example, the PWM module that delivers the switching commands to the driver half bridge is controlled, so as to compensate for the differential current between the predetermined current and the actual current. The differential potential is, is turn, offset thereby, and the actual potential is regulated to the predetermined potential.

The actual current may be fed to the control point as m phase currents, phase-shifted by 360°/m, where m>1. For this purpose, m current sources that deliver the m phase currents may be connected to the control point. This may be done, for example, by m current controllers controlling with phase offset w PWM modules, which in turn control with phase offset m driver half bridges that apply the phase currents with phase offset each via a choke (i.e., overall, m chokes) into the control point. If a plurality of identical half bridges together with chokes are used as current sources, it is sufficient to measure the actual current only at one half bridge and supply same to the m current controllers.

If the actual current is applied in m>1 phases, it is also possible to switch off the m phase currents, partially or entirely, in a manner dependent on the differential current. Thus, for example, a discontinuous drive is feasible. If the both the differential current and the potential difference are zero, then all of the phases may be deactivated, whereby no actual current is fed to the control point. This prevents switching losses of the driver half bridges with low currents. It is also possible, with a low differential current, for only a number of phases to deliver a phase current, and for another phase current to be switched thereto/away when a differential current threshold is exceeded/not met.

BRIEF DESCRIPTION OF THE DRAWINGS

The present invention shall be described in further detail hereinbelow with reference to FIG. 1 to 9, which illustrate advantageous embodiments of the present invention by way of example, in a schematic and non-limiting manner. In the drawings.

DETAILED DESCRIPTION OF THE EMBODIMENTS

Figure 1:
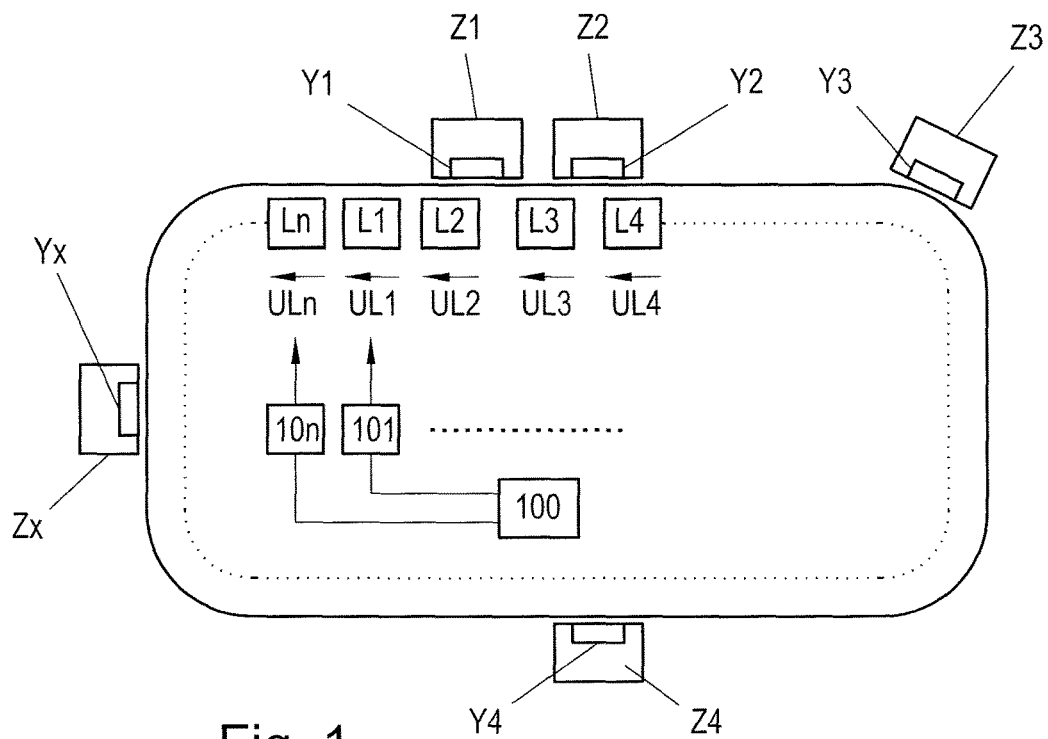
FIG. 1 illustrates a transport device in the form of a long-stator linear motor.

FIG. 1 depicts a transport device in the form of a long-stator linear motor (LLM), by way of example. The transport device is composed here solely of a transport section, but it shall be readily understood that in actual practice, it is also possible to have a plurality of transport sections—also forming non closed tracks—that are assembled together to make the transport device. The transport device is configured as an LLM with which each transport section constitutes, in a known manner, a part of a long stator of an LLM. A transport section may then also be further subdivided in a known manner, for example, into a number of individual transport segments in the form of coil assemblies with a plurality of LLM coils. A plurality of electrical LLM coils L1, . . . , Ln, which interact with excitation magnets Y1, . . . , Yn at the transport units Z1, . . . , Zx are therefore arranged along the transport section in the longitudinal direction, in a known manner. In an also known manner, a propelling force that moves the transport units Z1, . . . , Zx in the longitudinal direction along the transport section along the transport route is generated independently by means of coil control units 101, 10n through control of the coil voltages UL1, . . . , ULn of the individual LLM coils L1, . . . . Ln for each of the transport units Z1, . . . , Zx. Usually, a plurality of LLM coils L1, . . . , Ln that jointly generate the propelling force act simultaneously on one transport unit Z1, . . . , Zx. For reasons of clarity, FIG. 1 only depicts a small number of LLM coils L1, . . . , Ln and only two coil control units 101, 10n. It shall be readily understood that each coil voltage UL1, . . . , ULn of each LLM coil L1, . . . , Ln is regulated with a coil control unit 101, 10n, wherein a plurality of coil control units 101, 10n may also be integrated as one unit. Each of the transport units Z1, . . . , Zx may then be moved by means of a transport controller 100 superior to the coil control units 101, 10n in an individual (speed, acceleration, track, direction) and independent (except for preventing possible collisions) manner from the other transport units Z1, . . . , Zx. For this purpose, a position setting (equivalently also, a speed setting) that are implemented by the coil control units 101, 10n in corresponding coil voltages UL1, . . . , ULn required for the movement is continuously being specified by the transport controller 100, often for each transport unit Z1, . . . , Zx to be moved. As this basic principle of a long-stator linear motor is well known, there shall be no further discussion thereof here.

Figure 2:
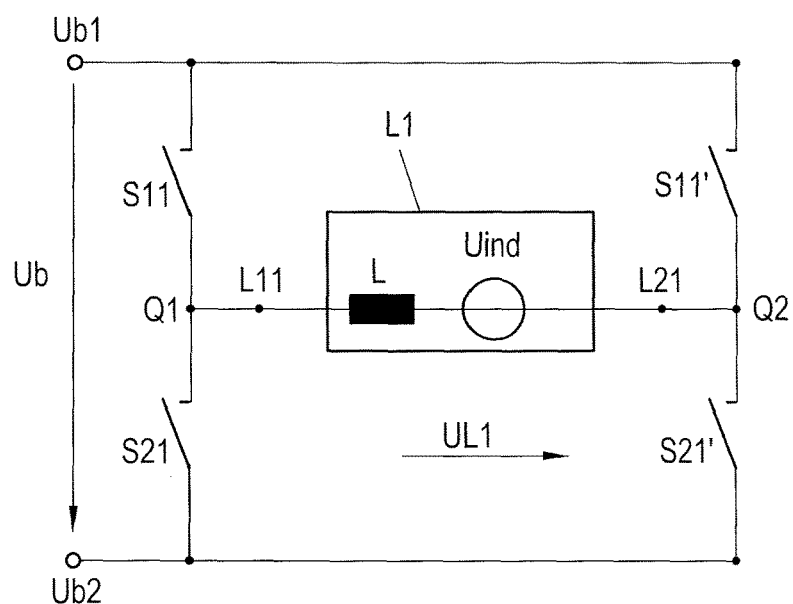
FIG. 2 illustrates a full-bridge control of an LLM coil.

FIG. 2 illustrates a full bridge of an LLM coil L1 according to the prior art. Then, the LLM coil L1 is modeled as an inductance L in series with a voltage source Uind. The voltage source Uind describes an induced voltage, e.g., in the event that a transport unit Z1, . . . , Zx of the LLM is moved past with excitation magnets. In addition, as usual, the LLM coil L1 has a first coil terminal L11 and a second coil terminal L12. The full bridge is composed of two main branches, wherein the first main branch is composed of two switches S11, S21 that lie in series at an operating voltage Ub formed by the difference from a first operating potential Ub1 and a second operating potential Ub2 at the input terminals of the full bridge. The second main branches, too, are composed of two switches S11', S21', which lie in series to the operating voltage Ub. The first transverse connection Q1 for a transverse branch is located between the connection point of the first switch S11 and the second switch S21 of the first main branch. Equivalently, the second transverse connection Q2 of the transverse branch is located between the connection point of the first switch S11' and the second switch S21' of the second main branch. The first coil terminal L11 of the LLM coil L1 is connected to the first transverse connection Q1, and the second coil terminal L12 of the LLM coil L1 is connected to the second transverse connection Q2. Suitable control of the switches S11, S21, S11', S21' makes it possible to apply a coil voltage UL1 between the first coil terminal L12 and the second coil terminal L22. The control of the full bridge for producing a coil voltage UL1 provides substantially two switch positions. In the first switch position, the first switch S11 of the first main branch and the second switch S21' of the second main branch are closed, whereas the second switch S21 of the first main branch and the first switch S11' of the second main branch are open. Thus, the operating voltage Ub is applied to the LLM coil L1 as the coil voltage UL1. In the second switch position provided by the control of the full bridge, the first switch S11 of the first main branch and the second switch S21' of the second main branch are open, whereas the second switch S21 of the first main branch and the first S11' of the second main branch are closed, whereby the negative operating voltage −Ub is applied as the coil voltage UL1 to the LLM coil L1. Both polarities are thus achieved for the coil voltage UL1 of the LLM coil L1.

It shall be readily understood that an LLM stator is composed not only of one but instead of a plurality n of adjacently-arranged LLM coils L1, . . . , Ln. In order to now be able to individually control all of the n LLM coils L1, . . . , Ln, a full bridge according to FIG. 2 would be required for each LLM coil L1, i.e., there would thus be required 4*n switches S11, S21, S11', S21', which are usually configured as semiconductor switches, such as bipolar transistors, MOSFETs, IGBTs, and the like. The high costs and increased space requirements for the technical implementation of the switches represent a disadvantage for this high number of switches S11, S21, S11', S21'. Because a high number of LLM coils L1, . . . , Ln already requires considerable space for the power components, it is desirable to use fewer switches S11, S21, S11', S21'. The routing (wiring on, for example, a board) is also always more complicated as the number of components increases; the more components used, the higher the chances of failure of a component.

Figure 3:
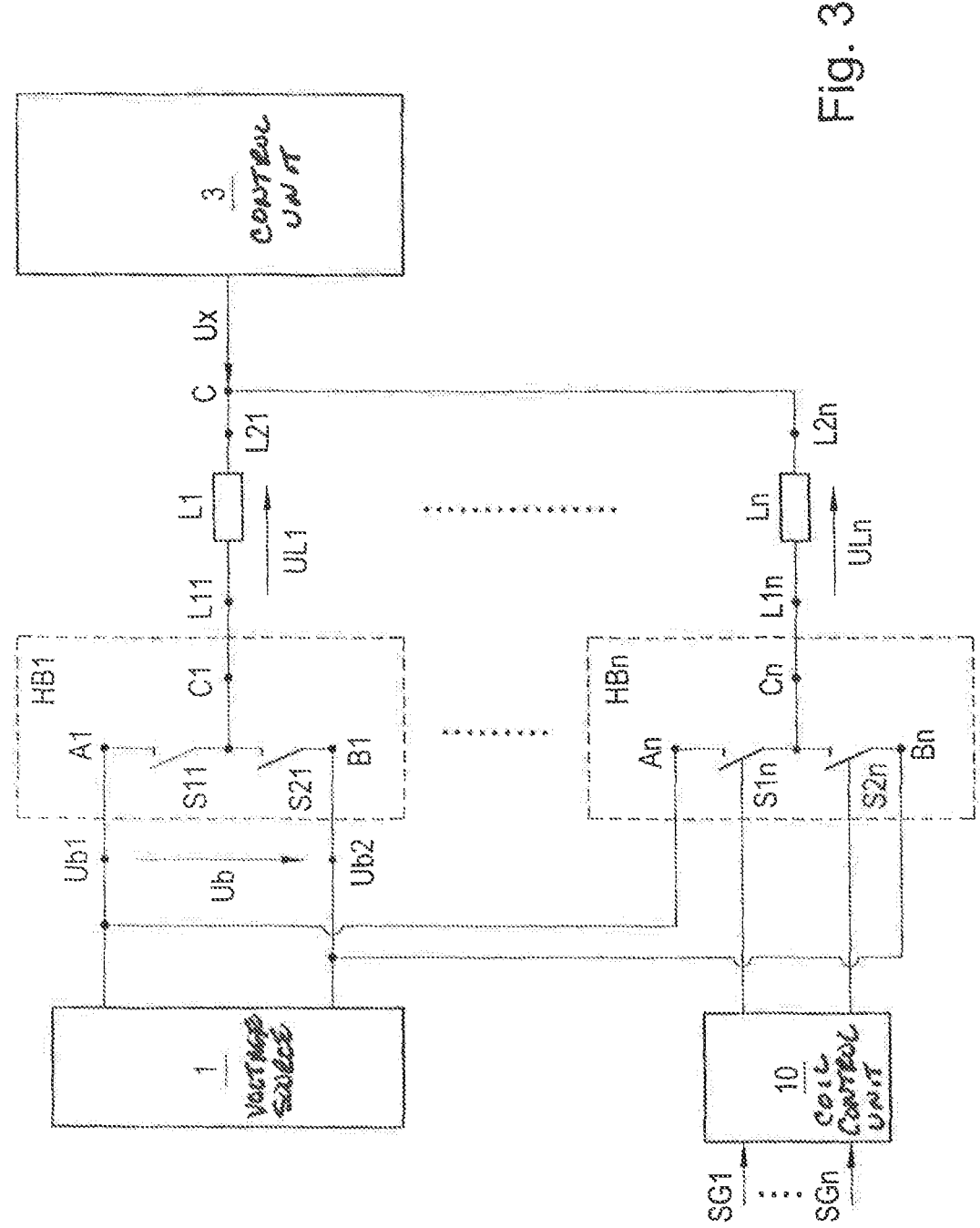
FIG. 3 illustrates a half-bridge control, according to the present invention, of an LLM coil.

Therefore, the present invention proposes a control of the LLM coils L1, . . . , Ln via n half bridges HB1, . . . , HBn. FIG. 3 shows a control according to the present invention of n—n being an integer greater than one—LLM coils L1, . . . , Ln by means of a respective associated half bridge HB1, . . . , HBn. The second main branches of the full bridge are forgone, whereby the operating voltage Ub is applied only to the first main branches, i.e., per half bridge HB1, . . . , HBn between the first input terminals A1, . . . , An and the second input terminals B1, . . . , Bn and the first switches S11, . . . , S1n and second switches S21, . . . , S2n connected therebetween in series. The respective connection point between the first switches S11, . . . , S1n and the second switches S21, . . . , S2n is called a center point C1, . . . , Cn, respectively, and is respectively connected to the first terminal L11, . . . , Ln1 of an LLM coil L1, . . . , Ln. The second terminal L12, . . . , Ln2 of the respective LLM coil L1, . . . , Ln is at an electrical potential Ux predetermined by a control unit 3. The second terminals L12, . . . , Ln2 of the LLM coils L1, . . . , Ln are therewith connected to one another in a control point C.

The switches S11, S21, . . . , S1n, S2n of the half bridges HB1, . . . , HBn are controlled by a coil control unit 10 (depicted only for the switches S1n, S2n in FIG. 3, for reasons of clarity). The coil control unit 10 controls the switches S11, S21, . . . , S1n, S2n in a known manner such that the magnetic field required for moving a transport unit is generated by energization of the LLM coils L1, . . . , Ln with the coil currents IL1, . . . , ILn or application of the coil voltages UL1, . . . , ULn. For this purpose, the coil control unit 10 may also obtain setpoint variables SG1, . . . , SGn for the control, i.e., from a transport controller 100, such as in FIG. 1.

Generally, with an LLM, a number of LLM coils L1, . . . , Ln are combined into a stator segment (also physically, in the form of a component). All of the LLM coils L1, . . . , Ln of a stator segment are then generally regulated by a coil control unit 10 with individual coil control unit 101, 10n for each LLM coil L1, . . . , Ln, but this is not essential for the present invention. It is therefore also advantageous to combine all of the LLM coils L1, . . . , Ln of a stator segment in terms of circuitry, as in FIG. 3, i.e., to connect same to one another on the output side at a control point C. So doing also necessitates a plurality of switches, as in FIG. 3, for a long-stator linear motor having a plurality of stator segments.

The control of the switches S11, . . . , S1n, S21, . . . , S2n provides now two switch positions. In the first switch position, the first switch S11, . . . , S1n is closed and the second switch S21, . . . , S2n is open, whereby the coil voltage UL1 arises from the difference from the first operating potential Ub1 and the predetermined potential Ux: UL1=Ub1−Ux. In the second switch position, the first switch S11, . . . , S1n is open and the second switch S21, . . . , S2n is closed, whereby the difference from the predetermined potential Ux and the second operating potential Ub2 arises: UL1=Ux−Ub2. It is clear that with different switch positions, different polarities of the coil voltage UL1 arise. This applies analogously for all of the LLM coils L1, . . . Ln.

For the special case where the second operating potential Ub2 is grounded (Ub2=0) and the predetermined potential Ux corresponds to half of the operating voltage Ub (Ux=Ub/2), the result is a coil voltage UL1 of Ub/2 in the first switch position and a coil voltage UL1 of −Ub/2 in the second switch position.

Because, as mentioned, an LLM stator or part of an LLM stator is composed of n LLM coils, n half bridges HB1, . . . , HBn are used in a design as described above for n LLM coils L1, . . . , Ln, whereby a savings of 2*n switches results as compared to the previously-described full-bridge control according to the prior art.

Figure 4:
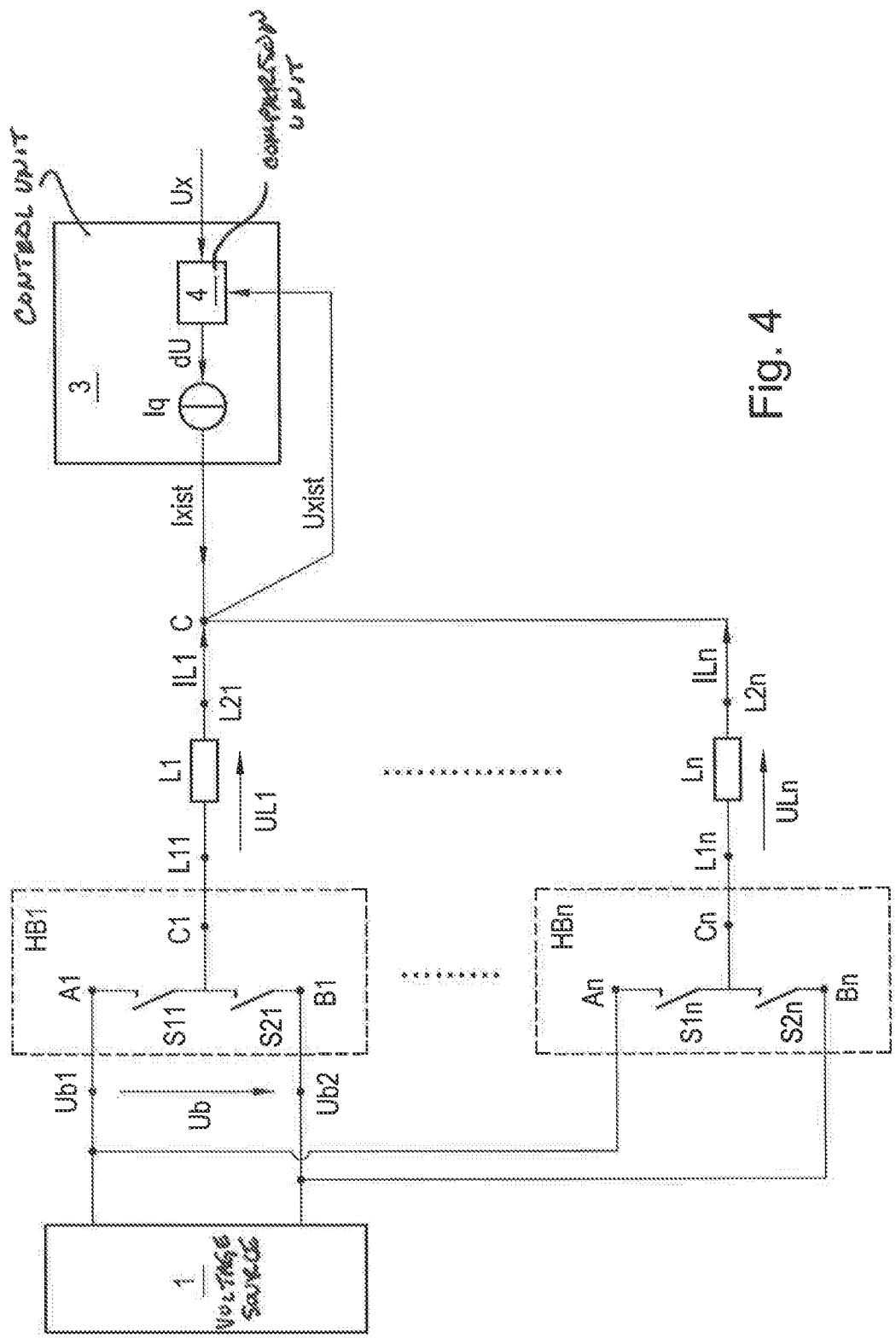
FIG. 4 illustrates a control of n LLM coils with n half bridges.

As represented in FIG. 4, the second coil terminals L21, . . . , L2n, which, indeed, are all held at the predetermined potential Ux, are connected to one another at a control point C. The LLM coils UL1, . . . , ULn are all regulated independently of one another. In general, each coil L1, . . . , Ln has a different coil voltage UL1, . . . , ULn and coil currents IL, . . . , ILn. If a coil voltage UL1, . . . , ULn is positive, then a coil current IL1, . . . , ILn flows from the coil L1, ..., Ln in question to the control point C and the actual potential Uxist rises. If a coil voltage UL1, ..., ULn is negative, then, consequently, a coil current IL1, ..., ILn flows out from the control point C to the coil L1, ..., Ln in question, and the actual potential Uxist falls. The sum of all of the coil currents IL1, ..., ILn through the LLM coils UL1, ..., ULn consequently an increase or decrease in the actual potential as a result, which is offset by the control unit 3 in order to keep the actual potential Uxist at a predetermined potential Ux.

On the input side, there is a voltage source 1, e.g., a rectifier, that provides the first operating potential Ub1 and the second operating potential Ub2 to the half bridges HB1, .... HBn. The switches S11, S21, ..., S1n, S2n of the n half bridges HB1, ..., Hbn are controlled by the coil control unit 10 (not depicted in FIG. 4) according to the desired polarity of the coil voltages UL1, ..., ULn in such a manner as already described above for an LLM coil L1.

The control unit 3 is used to adjust the predetermined potential Ux at the control point C, wherein the current actual potential Uxist is determined (e.g., measured) and presented to the control unit 3. In one configuration the control unit 3 controls a current source Iq in a manner dependent on a potential difference dU determined by a comparison unit 4 between the predetermined potential Ux and the actual potential Uxist, the current source feeding the actual current Ixist—which therewith also flows over the n LLM coils L1, ..., Ln—to the control point C. It shall be readily understood that the coil current IL1, ..., ILn flowing over the individual n LLM coils L1, ..., Ln may be positive or also negative. Because the actual current Ixist has been changed in accordance with the potential difference dU and is fed to the control point C, the actual potential Uxist also changes, and is adapted as a part of the controlling to the predetermined potential Ux, whereby the potential difference dU is preferably regulated to zero. It may also, however, be regulated to a predetermined potential difference dU not equal to zero. The comparison unit 4 may, as depicted in FIG. 4, be an integral component of the control unit 3, or may also be externalized as a separate unit.

Figure 5:
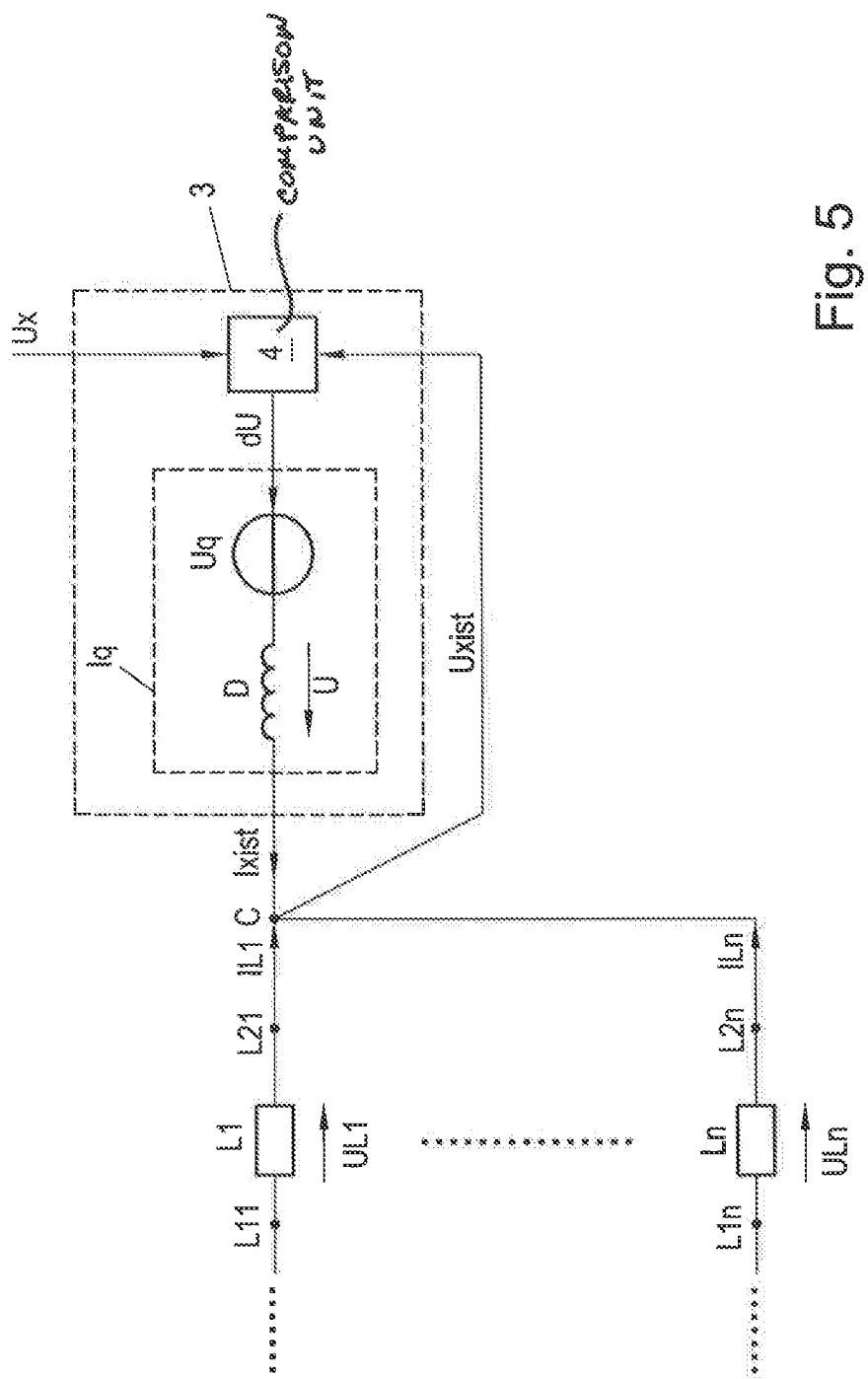
FIG. 5 illustrates a control with a configuration of the control unit.

FIG. 5 depicts an advantageous configuration of the control unit 3. Here, the current source Iq is realized by a voltage source U1 and a choke D (inductance). The voltage source Uq generates the voltage U at the choke D and thus gives rise to the actual current Ixist in the choke D, which is fed to the control point C, thereby influencing the actual voltage Uxist at the control point C.

Figure 6:
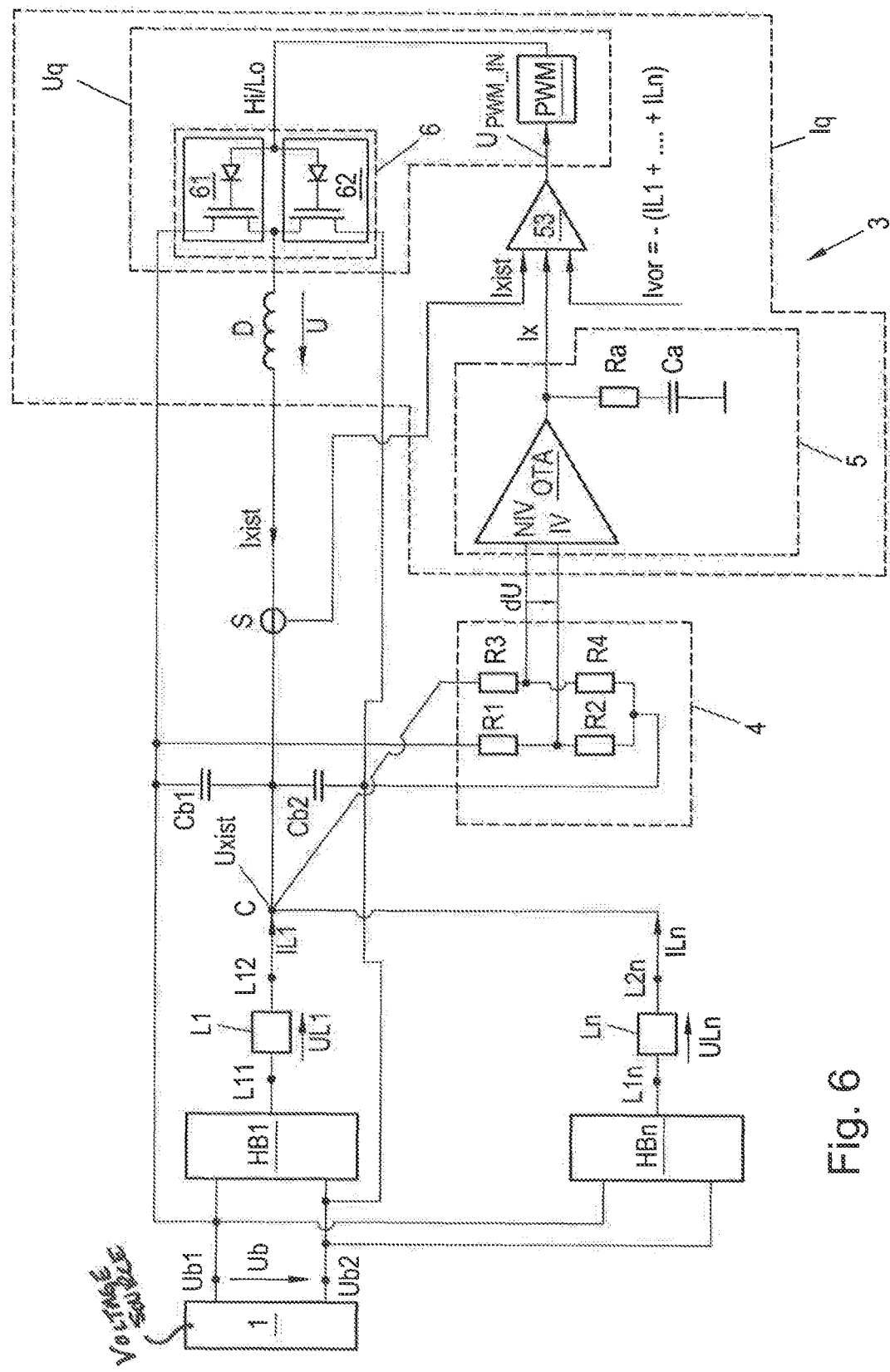
FIG. 6 illustrates a detailed configuration of the control unit.

FIG. 6 illustrates a device according to the present invention, with a preferred configuration of the comparison unit 4 and the voltage source Uq, as well as a conversion unit 5 which here is an integral component of the current source Iq. The comparison unit 4 here represents a resistor bridge circuit that is connected to the first operating potential Ub1, the second operating potential Ub2, and the control point C. For this purpose, over a first resistor bridge branch, the first operating potential Ub1 is connected in series via a first resistor R1 to a second resistor R2 with the second operating potential Ub2. A second resistor bridge branch connects the control point C to the second operating potential Ub2 over a third resistor R3 and a fourth resistor R4 that is connected in series. The differential potential dU between the predetermined potential Ux and the actual potential Uxist is applied between the connection point of the first resistor R1 and the second resistor R2 and the connection point of the third resistor R3 and the fourth resistor R4, whilst the resistors R1, R2, R3, R4 are sized accordingly. In order to achieve a predetermined potential of Ux=(Ub1-Ub2)/2, a size of, for example, R2=R3=R4=(1/3)R1 would be required. It shall be readily understood that the predetermined potential Ux could also be predetermined externally, for example, by regulatable voltage sources. Implementation through connections to the operating potentials Ub1, Ub2 proves especially simple, however. Also present in FIG. 6 are optional filter capacitors Cb1, Cb2 between the first operating potential Ub1/second operating potential Ub2, respectively, and the control point C. The differential potential dU is delivered from the comparison unit 4 to the conversion unit 5. The conversion unit 5 converts the differential potential dU into a predetermined current Ix. The conversion unit 5 may be realized by a PI controller, e.g., depicted in FIG. 6 by an operational transconductance amplifier (OTA) with an output-side RC element to ground. For this purpose, the differential potential dU is connected between an inverting input IV of the operation transconductance amplifier OTA and the non-inverting input NIV of the operation transconductance amplifier OTA. The operational transconductance amplifier OTA delivers a current Ix to be specified, which is proportional to the differential potential dU, at the output that is connected to ground by means of the RC circuit. The voltage at the capacitor Ca rises with the integral of the current Ix to be specified, and the voltage at the resistor Ra is proportional to the current Ix to be specified. It shall be readily understood that, alternatively, it would also be possible to use, for example, an OPV circuit having a capacitor and a serial resistor as feedback to the inverting input as the PI controller. Another capacitor for attenuating high-frequency currents may also be provided parallel to the capacitor and the resistor. Furthermore, a sensor S in this configuration does not measure the actual potential Uxist, but rather the actual current Ixist through the control point C. Thus, the sensor S can be easily realized as a shunt. A current controller 53 compares the predetermined current Ix and the actual current Ixist obtained from the sensor S, and determines the differential current. The current controller 53 is preferably configured as a PI controller. In addition to the current controller 53, the current source Iq in this configuration is composed of a choke D and a voltage source Uq, which, in turn, is composed of a driver half bridge 6 that is controlled by a PWM module PWM and obtains the control voltage $U_{PMWM\_IN}$ from the current controller 53 in accordance with the differential current. PWM stands for pulse width modulation, which is well known. Thus, the control voltage $U_{PMWM\_IN}$ is generated by the current controller 53, and the PWM module PWM controls the driver half bridge 6 so that the differential current is regulated to zero. Advantageously, the current controller 53 has a current pre-controller having a current pre-control input through which the pre-control current Ivor flows. This current pre-controller is used to discharge the control unit 3, here, in particular, the PI controller or operation transconductance amplifier OTA. With a pre-controller, a control variable is applied in a known manner with a value that is independent of the states of the control loop and resulting measurements, thus making it possible to take into account the control value need to be expected as a result of the set value profile. The pre-control current Ivor of the current pre-controller may be calculated with the aid of a model, e.g., via the node rule in the control point C. In this case, for example, the sum of all of the coil currents IL1, ..., ILn would correspond to the negative pre-control current −Ivor, as illustrated also in FIG. 6. The driver half bridge 6 is composed here of two semiconductor switches 61, 62 connected in series. Advantageously, the upper semiconductor switch 61 connects the first operating potential Ub1 to the second semiconductor switch 62, which, in turn, is connected to the second operating potential Ub2. The choke D connects the control point C to the connection point between the first semiconductor switch 61 and the second semiconductor switch 62 of the driver half bridge 6. The PWM module PWM switches, with a Hi signal, the first semiconductor switch 61, which thereby applies the first operating potential Ub1 to the choke D; likewise, with a Lo signal, the second operating potential Ub2 is applied to the choke D. Thus, a voltage U is applied in accordance with the control voltage $U_{PWM\_IN}$ determined by the current controller 53 to the choke D, which in turn affects the actual current Ixist in the control point C. The choke D integrates the rectangular voltage 7 and generates a triangular actual current Ixist that has been smoothed. The semiconductor switches 61, 62 of the driver half bridge are advantageously configured as GaN (gallium nitride) switches. This technology enables switching frequencies in the MHz range, whereby a choke D with lower inductance and thus lower size can be used.

Figure 7:
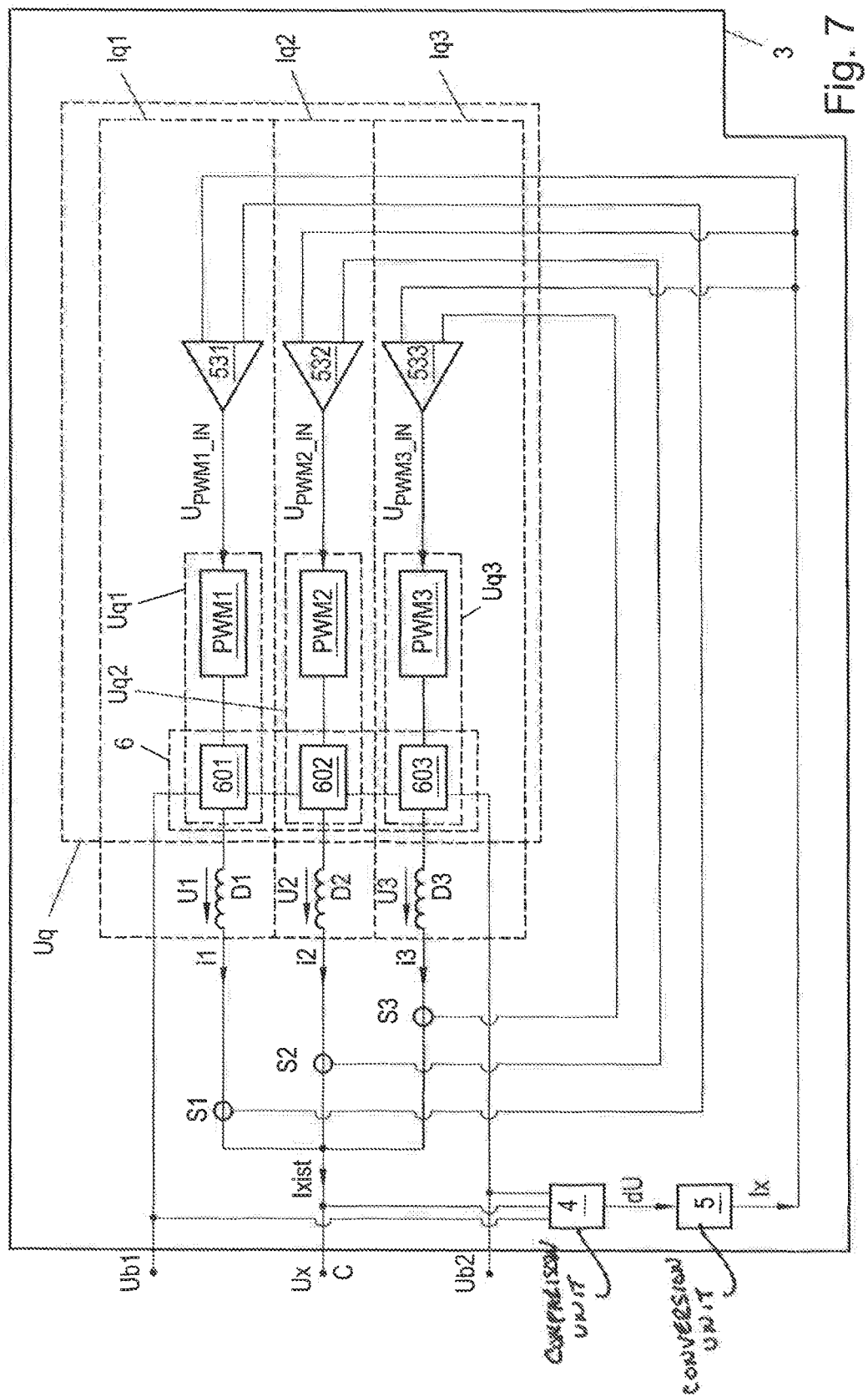
FIG. 7 illustrates a control unit with three-phase current control.

Advantageously, m>1—where m is a positive integer— parallel driver half bridges 6 are used in order to reduce the waviness and therewith the current ripples of the actual current Ixist, as shown in FIG. 7 with the example of three parallel driver half bridges 6. This also creates the need for m chokes D1, D2, D3, which must each have an inductance an m-th as great as the inductance of the single-phase configuration. The step response of the actual current Ixist makes it clear that the actual current Ixist rises m times as quickly with m parallel-connected inductances, and thus the predetermined current Ix can be achieved faster. The main advantage in using a plurality of driver half bridges 6, however, lies in the reduction of the generated power loss. Because the power loss is known to be proportional to the square of the actual current Ixist, for example, tripling the actual current Ixist brings about a reduction of the power loss by a factor of nine. As a matter of course, m current controllers 531, 532, 533 and current sources Iq1, Iq2, Iq3 are also necessary. The current sources Iq1, Iq2, Iq3 are controlled so as to deliver currents i1, i2, i3 with a phase shift of 360°/m, which are applied to the control point C, leading as a sum to the actual current Ixist in the control point C.

FIG. 7 represents a configuration with m=3 driver half bridges 601, 602, 603 and m=3 current sources Iq1, Iq2, Iq3. The m=3 current sources are composed of m=3 chokes D1, D2, D3, and m=3 voltage sources Uq1, Uq2, Uq3; the voltage sources Uq1, Uq2, U3 are, in turn, composed of m=3 PWM modules PWM1, PWM2, PWM3 and m=3 driver half bridges 601, 602, 603. Provided that the m=3 driver half bridges 601, 602, 603 are identically, even one sensor S would theoretically be sufficient for acquiring the actual current Ixist. Because this ideal case of absolutely identical driver half bridges 601, 602, 603 (and chokes D1, D2, D3, and so forth) typically does not occur in actual practice, FIG. 7 illustrates the general case of m=3 sensors S1, S2, S3. The conversion unit 5 is not an integral component of the current sources Iq1, I2, Iq3 in the configuration according to FIG. 7. It would also be conceivable to configure the conversion unit 5 as an integral component of the current sources Iq1, Iq2, Iq3, as in the configuration according to FIG. 6, wherein, however, three conversion units 5 would then be necessary.

Figure 8A:
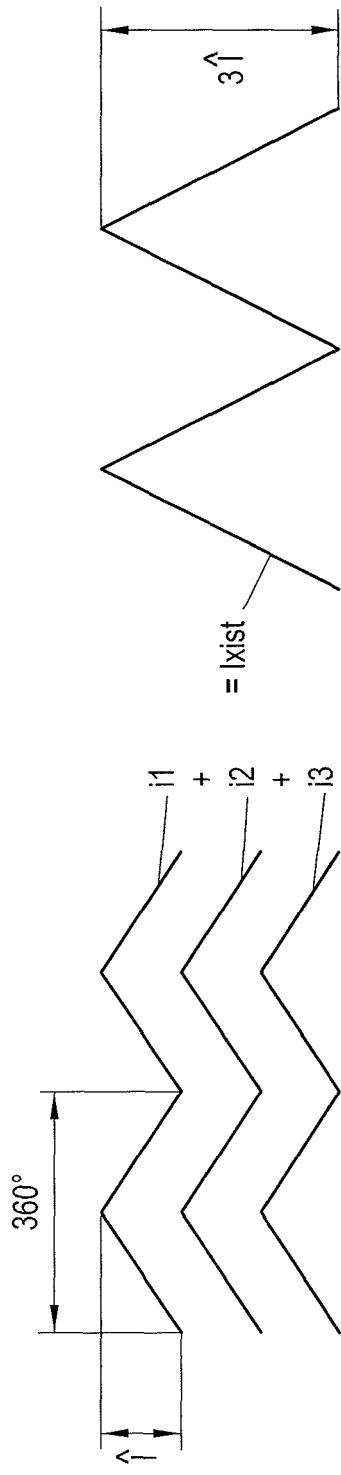
FIGS. 8A and 8B illustrate controlling by means of three phase currents.
Figure 8B:
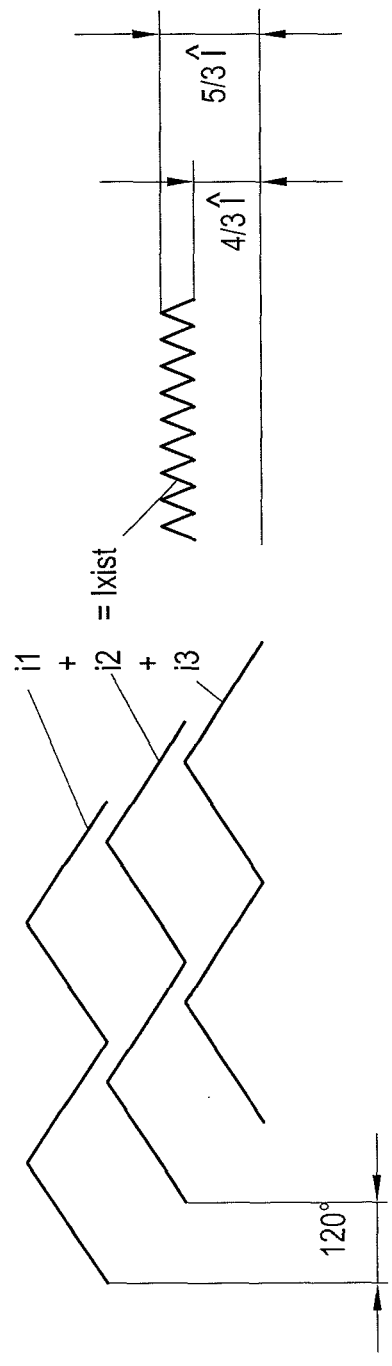

FIG. 8A illustrates the behavior of the m=3 currents i1, i2, i3 and the resulting actual current Ixist with the use of m=3 current sources Iq1, Iq2, Iq3 without phase shift. The original rectangular profiles of the voltages U1, U2, U3 generated by the voltage sources Uq1, Uq2, Uq2 are integrated by the m=3 chokes D1, D2, D3 into triangular current profiles of the m=3 currents i1, i2, i3. FIG. 8A depicts a control with three driver half bridges 601, 602, 603 without phase shift (corresponding qualitatively to a control with one driver half bridge 601, 602, 603 that delivers the actual current Ixist). FIG. 8B shows that with a control of the m=3 currents i1, i2, i3 that is phase-shifted by 360°/3=120°, the current ripples of the actual current Ixist are one-ninth as great as with a non-phase-shifted control. With a non-phase-shifted control, the current ripples of the actual current Ixist are three times as great as a peak current of a phase $\hat{I}$, whereas the ripple current of the actual current Ixist with phase-shifted control is $(5/3-4/3)*\hat{I}$, which corresponds to a third of the peak current of a phase $\hat{I}$.

Figure 9:
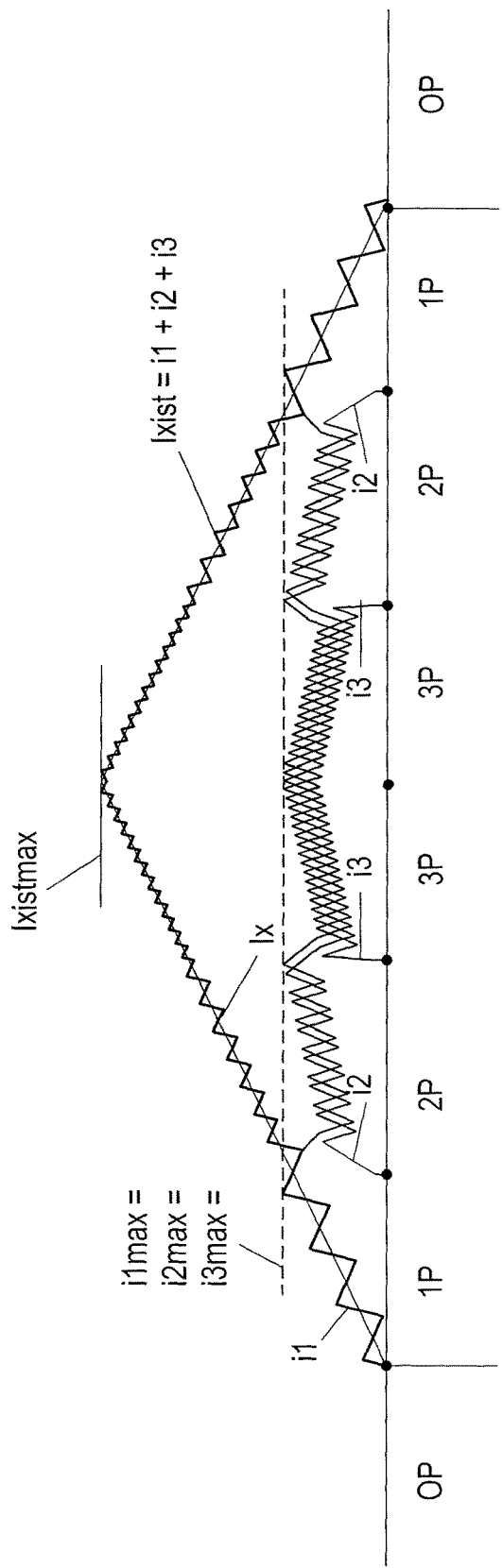
FIG. 9 illustrates the actual current, dependent on switching phase currents on and off.

If the application of the actual current Ixist is performed through m phase currents i1, i2, i3 in m phases, then it is also possible to switch the m phase currents i1, i2, i3 partially or entirely on or off in accordance with the differential current or the control voltage $U_{PWM\_IN}$ resulting therefrom, as illustrated schematically in FIG. 9. Each of the m current sources Iq may deliver a maximum phase current i1max, i2max, i3max, which are identical in FIG. 9. The maximum actual current Ixistmax that can be delivered from the control unit 3 to the control point C is accordingly m times as high, provided that the maximum phase currents i1max, i2max, i3max are of equal magnitude; otherwise, the maximum deliverable actual current Ixistmax results from the sum of the phase currents i1max, i2max, i3max. If an actual current Ixist of zero is sent out due to a differential current of zero, or the resulting control voltage $U_{PWM\_IN}$, then all of the current sources Iq are switched off, in order to keep a predetermined potential of Ux. If the actual potential Uxist rises or falls beyond a certain threshold, a phase current i1, i2, i3 is connected thereto. If a predetermined current Ix that exceeds the maximum phase current i1max, i2max, i3max is required, then a second phase current i1, i2, i3 must be connected thereto; if the predetermined current Ix is below a certain threshold, then a phase current i1, i2, i3 may be switched off, and so forth. Once a phase current i1, i2, i3 is connected thereto, the proportional component of the conversion unit 5 rises so that the actual current Ixist falls immediately. In FIG. 9, the first phase (first phase current i1) is active (range 1P); first the second phase (second phase current i2, range 2P) and then the third phase (third phase current i3 activated, range 3P), and then first the third phase (range 2P) and then the second phase (range 1P) and finally even the first phase are switched off. Zero active phases mean a discontinuous drive, which is characterized as range 0P in FIG. 9.

What is claimed:

1. A method for controlling a plurality of n coils arranged to form at least a part of a long-stator linear motor (LLM) stator, where n is number that is greater than 1, comprising:
   n first input terminals of n half bridges to which a first operating potential is applied;
   n second input terminals of then half bridges to which a second operating potential is applied,
   wherein, each half bridge comprises:
   a first switch is connected between a center point of a respective half bridge and a respective one of the n first input terminals; and
   a second switch is connected between the center point of the respective half bridge and a respective one of the n second input terminals,
   wherein center point of the n half bridges is, in each case, connected to n first terminals of the n coils, and wherein the second terminals of the n coils are connected in a control point that is regulated to a predetermined potential.

2. The method according to claim 1, wherein the predetermined potential corresponds to half the potential difference between the first operating potential and the second operating potential.

3. The method according to claim 1, wherein the second operating potential is zero.

4. The method according to claim 1, wherein: an actual potential is determined at the control point and compared to the predetermined potential; and that and an actual current is fed to the control point on the basis of a potential difference between the actual potential and the predetermined potential, in order to regulate the potential difference to a predetermined value.

5. The method according to claim 4, wherein the actual current is composed of m phase currents that are phase-shifted by 360°/m and is fed to the control point.

6. The method according to claim 5, wherein the m>1 phase currents are partially or entirely switched on or off in a manner dependent on the potential difference.

7. A device for controlling a plurality n of coils arranged to form in at least a part of a long-stator linear motor (LLM) stator, where n is number that is greater than 1, comprising:
   n half bridges, wherein each of the n half bridges includes a first input terminal, and a second input terminal, a first switch arranged between a center point of the half bridge and the first input terminal, a second switch arranged between the center point of the half bridge and the second input terminal;
   the n first input terminals of the n half bridges are connected to a first operating potential;
   the n second input terminals of the n half bridges are connected to a second operating potential;
   each half bridge is associated with a respective one of the n coils of the LLM,
   wherein the n center points of the n half bridges are respectively connected to a first terminal of each of then coils of the LLM;
   wherein second terminals of the n coils are connected to a control point; and
   a control unit is configured to regulate an actual potential of the control point to a predetermined potential.

8. The device according to claim 7, further comprising a comparison unit, wherein the comparison unit determines the potential difference between the predetermined potential and the actual potential in the control point; and wherein, in the control unit, a current source feeds an actual current to the control point in a manner dependent on a potential difference, in order to regulate the potential difference to a predetermined value.

9. The device according to claim 8, wherein the current source includes a choke and a voltage source, wherein the choke is connected to the control point and generates the actual current via a voltage generated by the voltage source at the choke.

10. The device according to claim 9, wherein the voltage source includes a PWM module and a drive half bridge, wherein the PWM module regulates the driver half bridge in a manner dependent on the differential potential.

11. The device according to claim 10, wherein the driver half bridge is fabricated with GaN switches.

12. The device according to claim 8, wherein the comparison unit includes a resistor network that is connected to the first operating potential, the second operating potential, and the control point, and determines the potential difference from the first operating potential, the second operating potential, and the actual potential at the control point.

13. The device according to claim 8, further comprising:
   a conversion unit connected to the comparison unit and converts the differential potential to a predetermined current;
   a sensor configured to measure the actual current in the control point; and
   a current controller, which is connected to the conversion unit and the sensor on the input side and is connected to the current source on the output side, is configured to obtain the predetermined current from the conversion unit and the actual current from the sensor, to determine a differential current, and to regulate the current source therewith.

14. The device according to claim 13, wherein the conversion unit is configured as a PI controller.

15. The device according to claim 8, further comprising m current sources, where m>1, wherein the m current sources are connected to the control point, and them current sources each feed to the control point, a phase current that is been phase-shifted by 360°)/m.

16. A long-stator linear motor (LLM) comprising:
   a stator device having a plurality n of coils, where n is number that is greater than 1; and
   a stator controller comprising:
      n half bridges, wherein each of then half bridge includes a first input terminal, a second input terminal a first switch arranged between a center point of the half bridge and the first input terminal, and a second switch arranged between the center point of the half bridge and the second input terminal;
      the n first input terminals of the n half bridges are connected to a first operating potential;
      the n second input terminals of the n half bridges are connected to a second operating potential;
      each half bridge is associated with a respective one of the n coils of the stator,
      wherein the n center points of the n half bridges are respectively connected to a first terminal of each of the n coils of the stator;
      wherein second terminals of the n coils are connected to a control point; and
      a control unit is configured to regulate an actual potential of the control point to a predetermined potential,
   wherein the stator controller is arranged to control the plurality n of coils of the stator device.

* * * * *